US012601695B2

(12) United States Patent
Kurz et al.

(10) Patent No.: US 12,601,695 B2
(45) Date of Patent: Apr. 14, 2026

(54) METHOD FOR MEASURING THE DETECTION SENSITIVITY OF AN X-RAY DEVICE

(71) Applicant: Sesotec GmbH, Schönberg (DE)

(72) Inventors: Reinhard Kurz, Rinchnach (DE); Doug Pedersen, Cambridge (CA)

(73) Assignee: Sesotec GmbH, Schönberg (DE)

( * ) Notice: Subject to any disclaimer, the term of this patent is extended or adjusted under 35 U.S.C. 154(b) by 300 days.

(21) Appl. No.: 18/556,911

(22) PCT Filed: Apr. 6, 2022

(86) PCT No.: PCT/EP2022/059098
§ 371 (c)(1),
(2) Date: Oct. 24, 2023

(87) PCT Pub. No.: WO2022/228840
PCT Pub. Date: Nov. 3, 2022

(65) Prior Publication Data
US 2024/0219327 A1 Jul. 4, 2024

(30) Foreign Application Priority Data

Apr. 29, 2021 (EP) ..................................... 21171124

(51) Int. Cl.
*G01N 23/18* (2018.01)
*G01N 23/04* (2018.01)
(Continued)

(52) U.S. Cl.
CPC ............. *G01N 23/18* (2013.01); *G01N 23/04* (2013.01); *G01N 23/083* (2013.01); (Continued)

(58) Field of Classification Search
CPC ............. G01N 2223/303; G01N 23/04; G01N 23/083; G01N 23/18; G06Q 10/00; (Continued)

(56) References Cited

U.S. PATENT DOCUMENTS 6,436,596 B1 * 8/2002 Aono .................... G03F 7/3071
430/944
2018/0209922 A1 7/2018 Yamakawa et al.
(Continued)

FOREIGN PATENT DOCUMENTS

CN 108519443 * 9/2018 ............. G01N 29/44
EP 3734259 A2 11/2020

OTHER PUBLICATIONS

Kruth JP et al. "Computed tomography for dimensional metrology" CIRP Annals, vol. 60, No. 2, Jun. 3, 2011 (Jun. 3, 2011), pp. 821-842, [retrieved on Jun. 3, 2011].

*Primary Examiner* — Zhiyu Lu
(74) *Attorney, Agent, or Firm* — AVEK IP, LLC; Kent R. Erickson

(57) ABSTRACT

The invention relates to a method for measuring the detection sensitivity of an x-ray device for recognizing foreign matter in a product, the x-ray device having a detector, the detection signal of which results in a detection image having a defined resolution, the detection image being evaluated in order to recognize foreign matter. In a test-body analysis phase, which is used to define the parameters for the product inspection, the damping of the detection signal in the detection image of the product by a test body of defined material and of defined size is measured and stored in the form of damping values. During the product inspection, the detection image of the product is offset at a plurality of positions using the stored damping values of the test body to determine the detection sensitivity.

15 Claims, 2 Drawing Sheets

(51) Int. Cl.
  G01N 23/083 (2018.01)
  G06T 7/00 (2017.01)
  G06T 7/13 (2017.01)
  G06T 7/60 (2017.01)

(52) U.S. Cl.
  CPC .............. G06T 7/0004 (2013.01); G06T 7/13 (2017.01); G06T 7/60 (2013.01); *G06T 2207/10116* (2013.01); *G06T 2207/20081* (2013.01); *G06T 2207/30128* (2013.01); *G06T 2207/30136* (2013.01)

(58) Field of Classification Search
  CPC . G06T 2207/10112; G06T 2207/10116; G06T 2207/20081; G06T 2207/30128; G06T 2207/30136; G06T 7/0004; G06T 7/13; G06T 7/60
  See application file for complete search history.

(56) References Cited

U.S. PATENT DOCUMENTS

| | | | |
|---|---|---|---|
| 2018/0214113 | A1 | 8/2018 | Yamakawa et al. |
| 2019/0162679 | A1 | 5/2019 | Yamakawa et al. |
| 2021/0004994 | A1 | 1/2021 | Kubo |

* cited by examiner

Fig. 2

| r = 2 mm | n = 1 | | | | | n = 5 |
|---|---|---|---|---|---|---|
| | 0 | 0,4 | 0,8 | 1,2 | 1,6 | 2 |
| m = 1 | 4 | 3,92 | 3,66 | 3,2 | 2,4 | 0 |
| | 3,92 | 3,84 | 3,58 | 3,1 | 2,26 | |
| | 3,66 | 3,58 | 3,3 | 2,78 | 1,78 | |
| | 3,2 | 3,1 | 2,78 | 2,12 | | |
| m = 5 | 2,4 | 2,26 | 1,78 | | | |

METHOD FOR MEASURING THE DETECTION SENSITIVITY OF AN X-RAY DEVICE

CROSS-REFERENCE TO RELATED APPLICATION

This application claims priority from European patent application No. EP 21171124.7 filed Apr. 29, 2021, the disclosure of which is hereby incorporated herein in its entirety by reference.

FIELD

In order to set up an X-ray machine which is used in the context of product inspection, i.e. for the detection of foreign matter in a product, in particular in the context of food inspection, a given product must be learned in a first step in which it is conveyed through the machine several times in a teach-in mode. In doing so, the machine is automatically configured such that the maximum detection sensitivity can be obtained with this product, i.e. the operating point of the machine is set in a manner such that a detection signal is obtained which can be utilised correctly.

BACKGROUND

The detection sensitivity for detecting foreign bodies of different sizes and materials which can actually be achieved is, however, not yet known and has to be determined in further time-consuming tests. To this end, different test cards with reference foreign bodies in the form of test balls are placed on the product and conveyed several times through the X-ray machine with the product. A test card contains a defined number of test balls produced from a given material (for example 100 pieces of glass or stainless steel or plastic) and with a specific diameter, for example in a range of 0.4 mm to 10 mm.

The detection sensitivity is then determined from the detection image obtained in this manner by means of image analysis software. The detection sensitivity is determined, for example, by relating the number of detected foreign bodies to the number of foreign bodies present on the test card. If, for example, the test card contains 50 test balls produced from glass with a 3 mm diameter, of which the image analysis software only detects 40 test balls as foreign bodies, this means that the detection sensitivity for glass foreign bodies with a diameter of 3 mm is 80%. This value is usually averaged from several test runs, which is personnel-intensive and time-consuming. In addition, different materials and sizes often have to be tested out as the foreign bodies, which makes the method even more time-consuming.

SUMMARY

Thus, the objective of the present invention is to provide a method which overcomes the disadvantages of the prior art, in particular the time-consuming determination of the detection sensitivity for foreign bodies.

This objective is achieved by the method in accordance with the invention according to the independent claim 1. Further advantageous aspects, details and embodiments of the invention arise from the dependent claims, the description as well as from the drawings.

The method in accordance with the invention for measuring the detection sensitivity of an X-ray machine for the purposes of detecting foreign matter in a product is based on a detector; the detection signal of the product produces a detection image with a defined resolution which is analysed for the purpose of foreign matter detection.

When a product is conveyed through the X-ray machine, a grey value image is generated which digitally expresses the attenuation of the X-ray beam through the product. The grey values are indirectly proportional to the material density and to the attenuation of the product in the X-ray beam. The darker the grey value image, the greater is the attenuation by the product because of the thickness and the density of the product material.

In a test body analysis phase which serves to determine the parameters for the product inspection, the attenuation of the detection signal in the detection image of a defined product by a test body with a defined material and defined size is measured in the form of attenuation values and stored. These test bodies serve to simulate foreign bodies in a product to be monitored, for example a foodstuff.

Thus, the aim is to examine in advance what effect a foreign body with a defined size and material has on the detection image of the product, i.e. the grey value of the detection image becomes darker at the position at which the test body covers the product. The attenuation value may, for example, be a value which indicates how strongly the grey value of the product is modified by the test body, in which case the attenuation value may be a factor which is related to the product grey value, for example by computation, for example by multiplication. However, in the context of relating, it is also possible to simply store the resultant grey value which is generated at the overlapping position by the test body as the attenuation value. In this case, the product grey value at the test body positions is simply replaced by the resultant grey value as the relationship.

These effects of the test bodies with different sizes and materials on the product are preferably implemented for different operating points of the X-ray detector and the X-ray source, so that the actual operating point of the X-ray machine is taken into consideration. Clearly, the effects of the test bodies on the detection image for different products are also examined in order to obtain a test body-specific attenuation value for all of the products to be examined.

During daily operations, i.e. during the continuous product inspection, the detection image of the examined product (product grey value) is now related to the stored attenuation values for the test body at a plurality of positions, in particular by computation (resultant grey value), in order to determine the detection sensitivity, for example by means of an image analyser, in the usual manner.

The difference between this and "manual" determination of the sensitivity therefore lies in the fact that in order to measure the detection sensitivity, test bodies no longer have to be "manually" placed on the product and the detection carried out, but simply, the desired test body data set is uploaded and related to the detection image for the product, in particular by computation. In order to measure the detection sensitivity, this image is preferably sent to an image analyser which determines how many of the "computed" test bodies are also detected by the image analyser, which constitutes the value for the detection sensitivity of the X-ray machine for the relevant test body (in the product inspection, the actual foreign body).

Because of the invention, then, the determination of the detection sensitivity is completely automated and can run without any additional conveying of the product together with test cards containing test bodies, so that the associated sensitivity can be determined directly after teaching-in of a product has been carried out, because by means of the invention, the test body information is calculated or set as a function of its material and size using software and related to the grey value image of the product, in particular by computation, as if a product with a test card had actually been recorded. All other information regarding the detection sensitivity can be automatically calculated from these "synthesized" images.

Correspondingly, in an advantageous further embodiment of the invention for determining the detection sensitivity, the detection image computed with the test bodies is supplied to an image analyser, for example an image analysis unit, and the ratio of the test bodies detected in the image analyser to the number of test bodies computed in the detection image is used as a measure of the detection sensitivity. This results in a percentage which provides information as to how good the X-ray detector and the X-ray source with its set operating points can resolve the differences in the detection image caused by the test bodies, which in turn constitutes a coefficient for how well the X-ray detector can detect relevant foreign bodies in the examined product.

Metal, glass and plastic parts which arise from the manufacture and processing of the products appear as foreign bodies, in particular in foodstuffs. Foreign bodies of this type have to be detected and the affected products have to be rejected from the line.

Preferably, the detection image is acquired as a grey value image and the attenuation value in the test body analysis phase is stored as an attenuation factor which is computed with the grey value image (product grey value) of the examined product into a resultant grey value during the continuous product inspection. In this manner, the test bodies for every specific product and every type of test body are included in the detection image of the product without taking up a lot of computing time. Thus, the method can be carried out rapidly for a plurality of test body materials, for example plastic, glass and metal, as well as for different sizes.

When the test bodies are included in the detection image of the product, at the edges of the test body regions in the product image, a sharp line is generated which could compromise the image analysis. Thus, preferably, the edge region of the detection image between the product grey value and resultant grey value is processed with a blurring function in order to avoid sharp grey value differences in the resulting image.

In an advantageous embodiment of the invention, the detection image is divided into raster points in correspondence with the resolution of the detector. A computation of the test body image with the detection image of the product (product grey value) then preferably takes place in a manner such that at each point of the computation of the detection image with the stored attenuation values for the test body, the thickness at the various points of a test body is determined from the average of four adjacent raster points. Because the test bodies are usually spherical, they have a reducing radiographic thickness from the centre out to the edge, which naturally has to be taken into account in the computed image. By averaging over four points, it is not necessary for every resolution point of the test body thickness to be determined individually by the computer, and the averaging means that a certain smoothing of the transitions in the thicknesses is automatically obtained.

The separate attenuation values of a spherical foreign body in the case of a ball are in particular distributed over the raster points in n columns and m rows in accordance with the formula:

$$D(n, m) = 2 \times r \times \cos\left(\sin^{-1}\left(\frac{\mathrm{rd} \times A \times \sqrt{n^2 + m^2}}{r}\right)\right)$$

In this regard,

D (n, m) [mm] means the test body thickness at the raster point n, m r [mm] means the radius of the ball n means the number of columns in the x-direction (abscissa)

m means the number of rows in the y-direction (ordinate)

rd [mm] means the detector resolution

A means the imaging factor.

Preferably, therefore, in the test body analysis phase for a test body material, the attenuation values are measured for different test body thicknesses. The attenuation value for a specific, non-measured test body thickness can then be calculated from these attenuation values.

In a further advantageous embodiment of the invention, in the test body analysis phase, the product and test body-specific measurement and storage of the attenuation values is carried out for different operating points of the X-ray machine. In this manner, the attenuation factors for the test bodies are obtained for every operating point of the X-ray source, which means that the test body computation for determining the detection sensitivity can be carried out at all operating points of the X-ray source.

Preferably, during the continuous product inspection, the detection image (product grey value) is multiplied by the stored attenuation value. This is the simplest computational model for the influence of the test body on the product image. If, for example, the factor is 0.7, then at the test body site, the brightness of the product grey value is multiplied by the factor 0.7, whereupon a correspondingly darker resultant grey value region is generated.

In an advantageous embodiment of the invention, during the continuous product inspection, the positions of the foreign bodies on the X-ray image are specified with the aid of a test raster which is set up using software, wherein the distances between the test bodies are specified such that the risk of image analysis errors when determining the detection sensitivity is eliminated.

Preferably, the attenuation values in the test body analysis phase are stored in the form of characteristic curves in which different linear product grey values are plotted along the abscissa and linear resultant grey values are plotted up the ordinate, wherein test bodies of different materials and different thicknesses are described in these characteristic curves. The resultant grey values can readily be determined from these characteristic curves for different products and different test body materials and sizes, the resultant grey values then being substituted for the test body in the detection image of the product. Correspondingly, then, during the product inspection, the attenuation value is quite simply determined from the characteristic curves.

In an advantageous further embodiment of the invention, a continuous monitoring of the operating points of the X-ray machine is carried out on the basis of the measured detection sensitivity. Thus, in the case of a deterioration of the detection sensitivity of the X-ray machine, either its operating points can be reset, or maintenance can be carried out if the drop-off in the detection sensitivity is unusual.

Preferably, the effects of subsequent modifications to the detection parameters on the detection sensitivity, in particular relearning of product properties, are checked on the basis of the measurement of the detection sensitivity. It can immediately be seen hereby whether any "manual" relearning steps lead to a reduction in the detection sensitivity and can be repaired.

In an advantageous embodiment of the invention, the computed detection images are used for the parameterisation of the X-ray machine as early as during the standard learning procedure for a product. This means that the "virtual", i.e. computed, test body images can also be used for setting the X-ray machine itself.

A computed test body image may also contain different attenuation factors, in accordance with the geometry of the test body. The product grey value image (detection image) is therefore computed over the area of the test body with the "test body image" which has different attenuation factors corresponding to its geometry. Thus, a spherical test body attenuates more in the centre of the test body image than at the edge, because the thickness of the material in the X-ray beam is thicker there. An X-ray detector has a certain resolution. The test body image which is generated in the analysis phase therefore extends over a certain pixel region, wherein (in the case of a spherical test body) the pixels in the centre of the test body image have a lower attenuation factor than at the edge of the test body image.

It will be obvious to the person skilled in the art that the embodiments of the invention described above can be combined with each other in any manner.

The following terms are used synonymously: machine—X-ray machine; detection image—product image—grey value image—product grey value—input grey value; resultant grey value—grey value of the detection image after computation at the site of a test body; image analyser—image analysis unit; test body image—region of computation of a test body in the product image, with different attenuation factors depending on the geometry.

BRIEF DESCRIPTION OF THE DRAWINGS

The invention will now be explained in more detail with the aid of an exemplary embodiment and with reference to the drawings, in which:

FIG. 2 shows a table with the test body thickness of a spherical test body in a resolution of n-m points.

DETAILED DESCRIPTION

Figure 1:
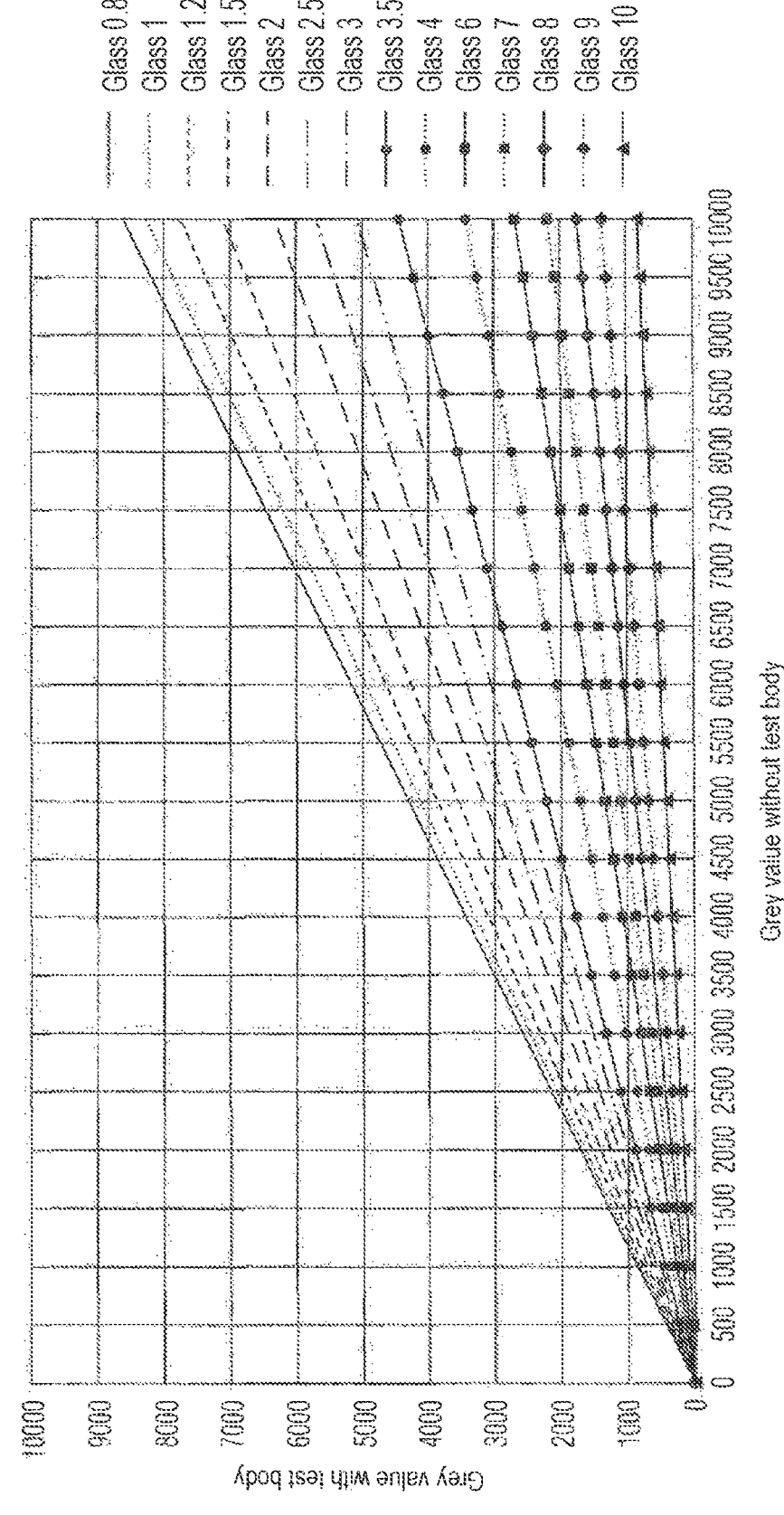
FIG. 1 shows a diagram for determining the attenuation factor with the product grey value on the X axis and the resultant grey value for different test body materials and sizes on the Y axis; in the case of a specific operating point.

The transmission parameter, i.e. how strongly an X-ray beam is absorbed by a material, basically depends on the type of material and the thickness of the material of the examined product. Furthermore, the brightness of the detection image of a product obtained in the X-ray machine also depends on machine parameters such as the X-ray power and the general geometrical conditions in the X-ray machine.

Conveying a product through the X-ray machine generates a grey value image which digitally expresses the attenuation of the X-ray beam. The grey values are indirectly proportional to the density of the material and to the attenuation of the product in the X-ray beam. The darker the grey value image, the higher is the attenuation and the density of the material.

The invention now facilitates the determination of the detection sensitivity because in order to determine it, the test bodies no longer have to be placed on the product and conveyed through the X-ray machine, but the effects of the test body on the product image are measured and stored beforehand in an analysis phase in the form of attenuation values, in particular attenuation factors. Thus, in the product monitoring operation, the test bodies are now only simulated by the software, in which the product image of the product to be examined is related to the attenuation values, for example by computation.

In order to simulate the effect of a test body in conjunction with the product, the grey value image of the product must be modified by the software as appropriate to the type of material and the thickness of the material of the test body and as a function of the operating point of the X-ray source.

To this end, in a first step, for each ball size of a test body of a type of material (metal, plastic, glass, etc) which is available, a test series is run on the X-ray machine for each possible operating point of the X-ray source, in order to directly associate the influence of the test bodies with the various specified ball diameters contained in the test cards with the grey values present in the image. Here, for example, each individual test card is placed on stacks of paper of different thicknesses as a reference for a product with a particularly homogeneous grey value distribution and conveyed through the machine. From the grey value images which are generated, in the case of each paper stack thickness, the grey value of the darkest pixel within a test ball is recorded for the various sizes of the test body balls.

In order to determine the percentage attenuation for the various ball diameters of the test bodies, the ratio of the last-mentioned pixel to the mean of the product image without foreign bodies is determined. The result is a constant attenuation factor for each ball diameter over the various paper thicknesses. In the next step, a straight line model is set up, as reproduced in FIG. 1.

In this diagram of FIG. 1, the input grey values, or also product grey values without foreign bodies, are plotted horizontally in the coordinate system and the grey values resulting from the influence of the test bodies on the product are plotted vertically. The attenuation factors determined in the analysis step can be seen here as slopes of the straight lines, so that for each thickness and type of material of a test body, a straight line which passes through the origin with an individual slope over the entire possible range of grey values is generated. All of the straight lines are located between the bisector of the angle of the Cartesian coordinate system and the horizontal axis, because the attenuation factors and therefore the slopes of the straight lines lie in the range between 0 and 1.

The slopes set in the straight line model of FIG. 1 represent the attenuation factors for the precisely specified ball diameter. However, it is also possible to determine attenuation factors for other test body sizes which have not in fact been determined in the analysis phase. With the aid of the ball diameters which have actually been measured in the analysis phase, characteristic curves (for example mathematical functions) are generated, with which these intermediate values are calculated.

The model shown in FIG. 1 as well as the characteristic curve serve as a basis for the modification, by the software, of the product images by the attenuation values or attenuation factors of the test bodies. This should be compiled for each operating point of the X-ray source and for each type of material, in order to verify the direct relationship to the actually recorded product images and to enable a more simple validation of the simulation model to be carried out. Further influencing factors for this straight line model are the technical properties of the X-ray source and detector and their separation from each other.

Calculation of Synthesized Foreign Body Images

Following on from the discussion above regarding defining the attenuation parameters as a function of the influencing factors to be considered for any material thickness, in this section, the calculation of the synthesized test body images is described; they are generally spherical.

In this regard, for each test body or for each test body image, different attenuation factors can be given which take into account the geometry and therefore the different thicknesses of the test body. Thus, a spherical test body attenuates more in the centre than at the edges, because the thickness of the test body is greater there. This is taken into account in the following equation.

The starting point here is the following mathematical relationship for determining the thickness at any point of a ball as a function of the radius r of the ball and a pixel grid which is mapped using n and m.

$$D(n, m) = 2 \times r \times \cos\left(\sin^{-1}\left(\frac{\text{rd} \times A \times \sqrt{n^2 + m^2}}{r}\right)\right)$$

in which

D (n, m) [mm] is the ball thickness as a function of n and m r [mm] is the radius of the ball n is the number of columns in the x-direction m is the number of rows in the y-direction rd [mm] is the detector resolution A is the imaging factor.

With the aid of the imaging factor A ($0<A\leq1$), the imaging conditions of an X-ray machine are taken into account. This incorporates the distance between the X-ray source and detector, the focal spot of the X-ray source and the detector resolution. The imaging factors were initially determined empirically, in which the actual ball sizes were compared with the image of the ball on the X-ray image, related to each other and converted, taking the detector resolution into consideration. In addition, the accuracy of this procedure was confirmed with a theoretical imaging calculation. Thus, the imaging factor is the ratio of the size of an item in the detection image/actual item.

X-Rays with Software-Based Sensitivity Prediction

Figure 2:
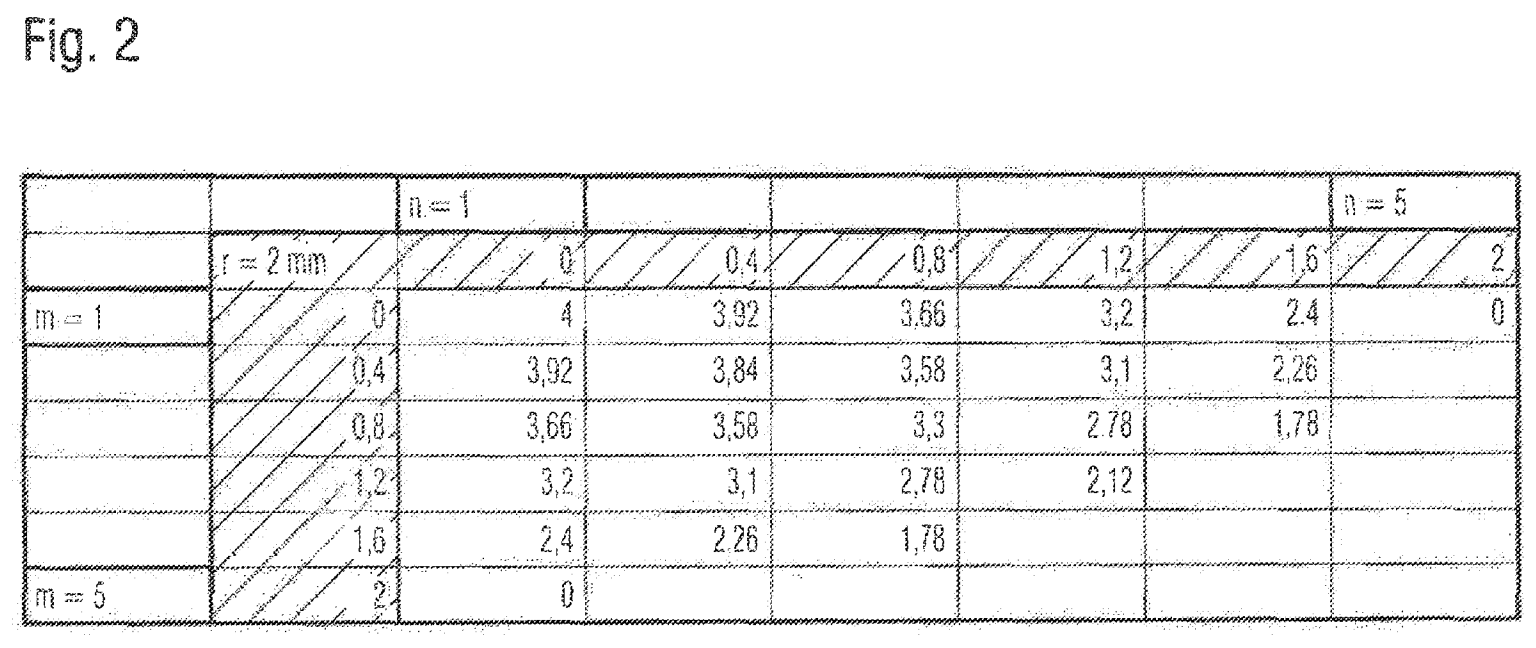

By including the pixel grid corresponding to the resolution of the X-ray detector, the spatial resolution of the detector can be verified mathematically. In the x-direction and the y-direction, this is composed of a multiple of the product of the detector resolution rd and the imaging factor A. For the imaging factor A=1, in the case of a detector with a resolution of rd=0.4 mm and a ball radius of r=2 mm, the grid shown in FIG. 2 is generated, by way of example. Because of the point and axial symmetry of a ball, it is sufficient to compute a quarter of a ball in order to be able to determine the thicknesses of the entire ball. A corresponding table is reproduced in FIG. 2.

With the four corner points of all of the squares present in the grid with side lengths of rd*A, a mean thickness per square can be calculated, which is associated with the attenuation straight lines shown in FIG. 1. With the recorded grey values of the product images and the associated attenuation, the new grey value for the synthesized X-ray image can be calculated by multiplication. After the grey value computation for the individual pixel, in addition, a blurring function may be used for the two outer pixel layers of the foreign body in order to shape the transition from the simulated test ball (test body image) to the product (product image) realistically.

After the first automatic determination of the sensitivities with the aid of the synthesized X-ray images for the learned product, modifications to the setup of the X-ray machine can be determined more easily. To this end, the first determination of the sensitivity must be checked during continuous operation. The check may on the one hand be carried out at specific time intervals, or on the other hand by carrying out specific actions in the operating software. The first-mentioned check assists with maintenance and validation of the machine because, for example, decreasing signal quality of the X-ray beam would be shown up. By checking during specific actions by the user, operator errors can be identified immediately, for example if sets of parameters are modified detrimentally. In addition, modifications in the learned product can be diagnosed when the material density or the homogeneity of the grey values of the product varies. Because of the accurate simulation of the foreign bodies, in the next step, the synthesized images can also be used directly for the configuration and automatic optimisation of the analysis parameters of an X-ray machine, as early as during the learning process.

The invention claimed is:

1. A method for measuring the detection sensitivity of a detector of an X-ray machine, where a detection signal of the detector produces detection images with a product grey value having a defined resolution, and where the product grey value is analyzed for the purpose of detecting foreign matter in a product, the method comprising the following steps:

in a test body analysis phase, for determining the parameters of a product inspection:

capturing a detection image of the product while there are also a number of test bodies present, the test bodies having a defined material and a defined size; and measuring and storing of attenuation values of the product by determining an attenuation of the detection signal in the detection image of the product caused by the test bodies;

during a continuous product inspection phase:

capturing a product grey value;

relating the product grey value, at a plurality of positions, to the stored attenuation values for the test bodies in order to produce resultant grey values; and determining the detection sensitivity by an analysis of the resultant grey values.

2. The method of claim 1, wherein, the resultant grey values are supplied to an image analysis unit and a numerical ratio of the test bodies detected by the image analysis unit compared to the number of test bodies computed in the detection image of the test body analysis phase is used to determine the detection sensitivity.

3. The method of claim 1, wherein the product grey value is measured as a grey value image, and the attenuation values are stored in the test body analysis phase as attenuation factors which, during the continuous product inspection phase, are computed into the resultant grey value using the grey value image.

4. The method of claim 3, wherein the grey value image is processed with a blurring function in the edge region between the product grey value and the resultant grey value.

5. The method of claim 1, wherein the product grey value is divided into raster points corresponding to the resolution of the detector, and at each of the plurality of positions where computation of the resultant grey values is performed, a thickness value of the test bodies is determined from the mean of four adjacent raster points.

6. The method of claim 1, wherein each of the attenuation values for a spherical foreign body, in the case of a ball, are distributed over raster points in n columns and m rows in accordance with the formula:

$$D(n, m) = 2 \times r \times \cos\left(\sin^{-1}\left(\frac{\text{rd} \times A \times \sqrt{n^2 + m^2}}{r}\right)\right)$$

wherein:

D (n,m) [mm] is the test body thickness at the raster point n, m;

r [mm] is the radius of the ball;

n is the number of columns in the x-direction (abscissa);

m is the number of rows in the y-direction (ordinate);

rd [mm] is the detector resolution; and

A is the imaging factor.

7. The method of claim 1, wherein, in the test body analysis phase for a test body material, the attenuation values are measured for different test body thicknesses, such that the attenuation values for a specific test body thickness is can then be calculated from these attenuation value measurements.

8. The method of claim 1, wherein, in the test body analysis phase, the measurement and storage of the attenuation values for specific products and test bodies is carried out for different operating points of the X-ray machine.

9. The method of claim 1, wherein, during the continuous product inspection, the product grey value is multiplied by the stored attenuation value.

10. The method of claim 1, wherein, during the continuous product inspection, positions of the foreign bodies on the X-ray image are specified with the aid of a test raster which is set up using software.

11. The method of claim 1, wherein the attenuation values in the test body analysis phase are stored as characteristic curves, in which different linear product grey values are plotted along an abscissa and linear resultant grey values are plotted up the ordinate, wherein test bodies of different materials and different thicknesses are described in these characteristic curves.

12. The method of claim 11, wherein, during the product inspection, the attenuation of the detection signal is determined from the characteristic curves.

13. The method of claim 1, wherein a continuous monitoring of different operating points of the X-ray machine is carried out on the basis of the determined detection sensitivity.

14. The method of claim 1, wherein effects on detection sensitivity caused by subsequent modifications to one or more detection parameters, particularly a relearning of product properties, is checked by additional measurements of detection sensitivity.

15. The method of claim 1, wherein the resultant grey values are used for a parameterization of the X-ray machine during, or any time after, a standard learning procedure for a product.

* * * * *